(No Model.) 2 Sheets—Sheet 1.

C. PERSON.
BREAD BOX AND SLICER.

No. 572,820. Patented Dec. 8, 1896.

WITNESSES:
Paul Johal
C. R. Ferguson

INVENTOR
C. Person
BY
Munn & Co
ATTORNEYS (No Model.) 2 Sheets—Sheet 2.

C. PERSON.
BREAD BOX AND SLICER.

No. 572,820. Patented Dec. 8, 1896.

WITNESSES:
Paul Jokol
C. R. Ferguson

INVENTOR
C. Person
BY
Munn & Co
ATTORNEYS

UNITED STATES PATENT OFFICE.

CHARLES PERSON, OF ST. JOSEPH, MISSOURI.

BREAD BOX AND SLICER.

SPECIFICATION forming part of Letters Patent No. 572,820, dated December 8, 1896.

Application filed December 23, 1895. Serial No. 573,023. (No model.)

*To all whom it may concern:*

Be it known that I, CHARLES PERSON, of St. Joseph, in the county of Buchanan and State of Missouri, have invented certain new and useful Improvements in Bread Boxes and Slicers, of which the following is a full, clear, and exact description.

This invention relates to boxes for loaf-bread and means for slicing the same, the object being to provide such a device with which bread may be sliced rapidly, thereby making it very useful for hotels, restaurants, boarding-houses, or other places where large quantities of bread are used.

The invention comprises a loaf-feeding device, a rotary cutter, a frame upon which the parts are mounted, and a compartment-box within which the above parts may be removably placed.

The invention further consists in the construction and novel arrangement of parts, as will hereinafter appear, and be particularly pointed out in the appended claims.

Reference is to be had to the accompanying drawings, forming a part of this specification, in which similar characters of reference indicate corresponding parts in all the figures.

Figure 1:
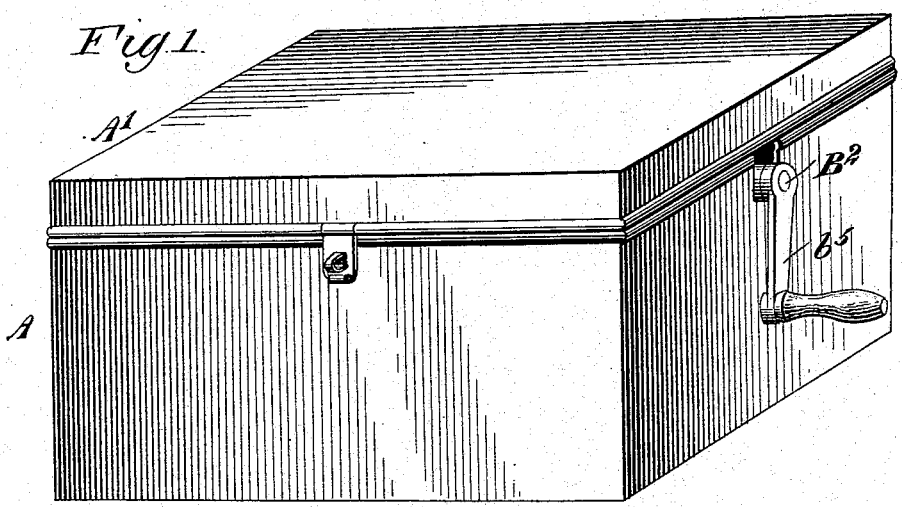
Figure 2:
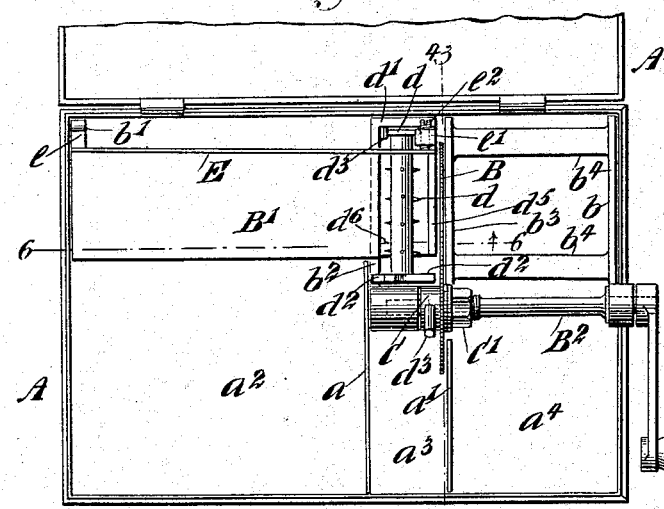
Figure 3:
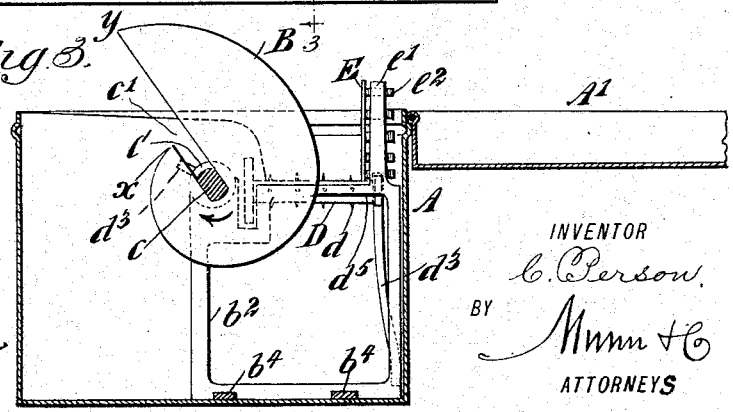
Figure 4:
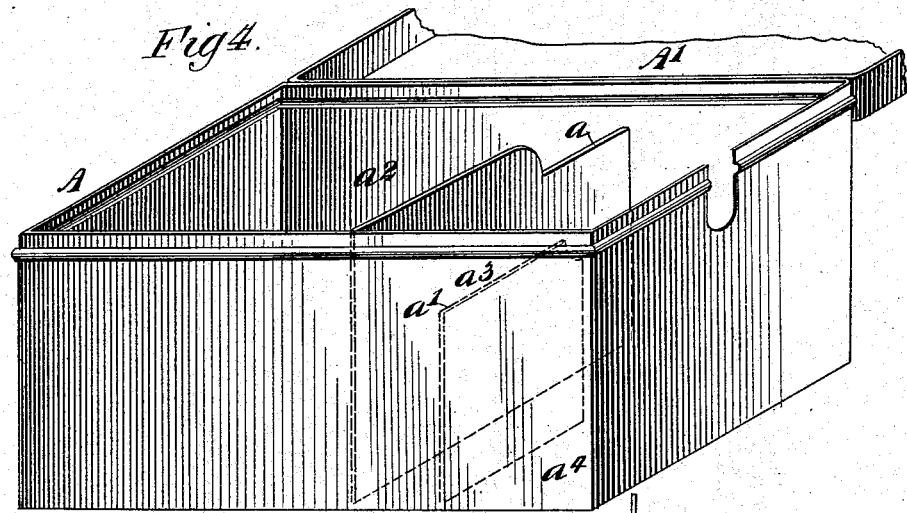
Figure 6:
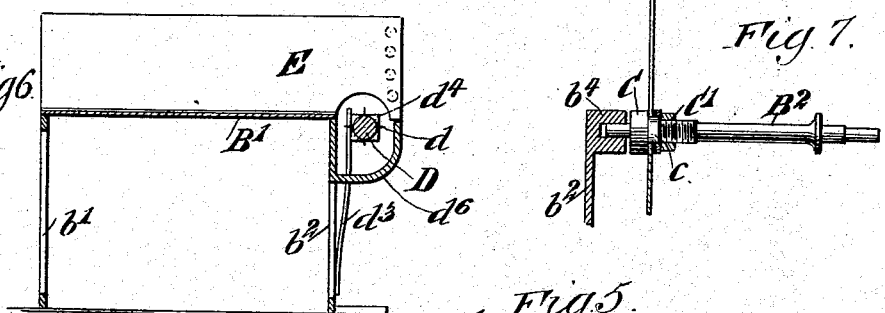
Figure 7:
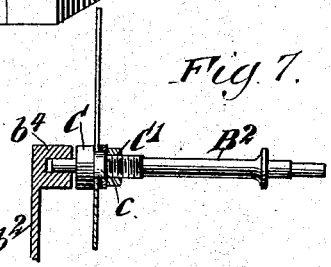
Figure 5:
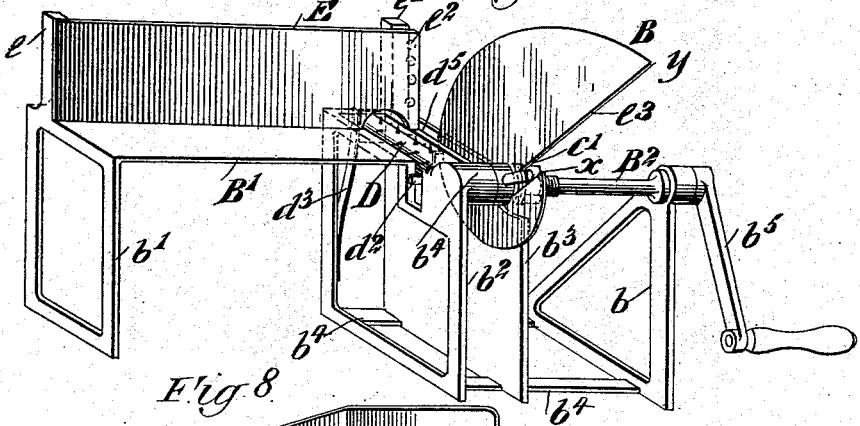
Figure 8:
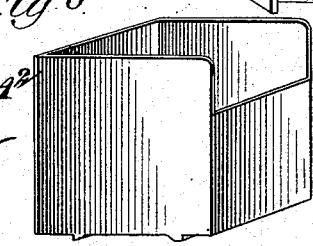

Figure 1 is a perspective view of a box embodying my improvement and showing the box closed. Fig. 2 is a plan view with the box open. Fig. 3 is a section on the line 3 3 of Fig. 2. Fig. 4 is a perspective view of the box open and with the slicer removed. Fig. 5 is an elevation in perspective of the slicer removed from the box. Fig. 6 is a section on the line 6 6 of Fig. 2. Fig. 7 is a sectional view showing the manner of securing the cutter to its shaft, and Fig. 8 is a perspective view of slice-box employed.

Referring to the drawings, A designates a box of suitable material, such as metal, and provided with a hinged cover A'. Extended transversely across the interior of the box is a partition $a$, and extended part way across the box is a partition-section $a'$. Thus is formed in the box a compartment $a^2$ for loaf-bread, a compartment $a^3$ for the working parts of the slicer, and a compartment $a^4$ to receive the slices of bread as cut from the loaf.

The frame of the slicer comprises the end uprights $b$ $b'$ and the intermediate uprights $b^2$ $b^3$, between which the cutter B rotates. When the frame is in the box, the upright $b$ will engage against the inner side of the right-hand end of the box, the upright $b'$ against the inner side of the left-hand end of the box, the upright $b^2$ against the right-hand side of the partition $a$, and the upright $b^3$ will register with the section $a'$ to form a complete partition across the box. The uprights $b$ $b^2$ $b^3$ are secured together at the bottom by means of the plates $b^4$, and the upright $b'$ is secured to the upright $b^2$ by means of a platform B', which serves as a base upon which the bread loaf is to be moved while slicing.

$B^2$ is the shaft for the cutter B. It has a bearing at its inner end in a lug $b^5$ at the forward upper corner of the upright $b^2$, and its outer end has a bearing through the upper portion of the upright $b$. The shaft is extended outward to project through a slot in the end wall of the box A, and the outer end is provided with a crank-handle $b^5$. At the inner end the shaft has an abutment-flange C, and adjacent to this abutment the shaft is made angular or provided with opposite straight parallel sides, as indicated at $c$. Outward of the angular portion the shaft is screw-threaded to engage a clamping-nut C'. When in the box, the shaft $B^2$ will be about midway between the front and rear walls of the box.

The cutter B is made in the form of a segment, the curved cutting edge being eccentric to the axis of the cutter from the points $x$ $y$, so that the cutter will have operative movement entirely across the end of the platform B'. From its axis the cutter has an outwardly-opening slot $c'$, the parallel walls of which are adapted to engage against the walls of the portion $c$ of the shaft. By this construction it will be seen that by loosening the clamping-nut the cutter can be easily removed for the purpose of sharpening and that it may be rigidly held in place by means of the clamping-nut.

Extended transversely of the shaft $B^2$ and across the end of the platform B' is a feed-roller D, having projecting points $d$ to engage into a loaf of bread. The feed-roller has a bearing at one end in the lug $b^5$, and at the other end it has a journal-bearing in a bar $d'$ of the frame. At its forward end the roller D has a series (here shown as four) of radial fingers $d^2$, adapted to be engaged successively by a pin $d^3$, projected from the stop-flange C, so that upon each complete rotation of the shaft $B^2$ the feed-roller will be rotated one step to move the bread loaf a proper distance for the thickness of a slice to be severed. As a means to provide a regular feed for the feed-roller or to stop it at the end of each step in its rotation until the next step of its rotation I employ a spring-plate $d^3$, attached at one end to the frame and bearing with its free end against an angular portion $d^4$ of the feed-roller at the end opposite the fingers. The straight sides of this angular portion are equal in number to the fingers $d^2$. Between the feed-roller and the space through which the cutter moves while slicing is a rest-bar $d^5$, supported at one end by the bar $d'$ and at the other end by an arm $d^6$, extended from the upright $b^2$ and curved beneath the feed-roller.

E is a back guide extended along the back of the platform B' and at right angles thereto. At its outer end the back guide is fastened to a post $e$, projected upward from the upright $b'$, and at its other end said back guide is adjustably connected to a post $e'$, projected upward from the rest-bar $d^5$, by means of screws $e^2$. By this construction as the cutter is worn smaller by repeated grindings the end of the back guide may be adjusted into proper relation with the cutter, the guide being yielding material.

In operation a loaf of bread will be placed on the platform B' and against the back guide and held by one hand of an operator, and the cutter is rotated to sever a slice. When the slice is completely severed, the straight edge $e^3$ of the cutter will be below the line of movement of the loaf, and at this time the pin $d^3$ will engage a finger $d^2$ and rotate the feeder one step, and consequently carry the end of the loaf into proper position to be sliced by the cutter. When the slicer is in the box A, the severed slices will fall into the compartment $a^4$; but, if desired, the slicer may be removed from the box and successfully operated. Therefore the box is not a necessary element of my invention, but will be found quite convenient for keeping the bread in the proper condition and at hand for slicing.

In Fig. 8 I have shown a box $A^2$, that may be placed between the uprights $b$ $b^3$ to catch the slices when the device is used outside the box A. It has lugs on its lower side to engage with the plates $b^4$ to prevent sliding.

Having thus fully described my invention, I claim as new and desire to secure by Letters Patent—

1. In a bread-cutter, the combination with a supporting-frame, a rotating shaft mounted in the frame, and a cutter on said shaft; of a feed-roller mounted in the frame at right angles to the cutter, and provided with an angular portion, means for imparting a step-by-step motion to the feed-roller, and a spring having one end engaging the angular portion of the feed-roller, substantially as and for the purpose set forth.

2. In a bread-cutter, the combination with a supporting-frame provided with a platform for supporting the bread to be sliced, of a rotary shaft mounted in the frame and provided with a laterally-projecting pin at its inner end, a cutter mounted on the shaft, a feed-roller mounted in the frame at the end of the platform and at right angles to the cutter-shaft and provided with an angular portion and radial fingers adapted to be engaged by the pin of the cutter-shaft, and a spring engaging the angular portion of the roller to stop it at the end of each step in its rotation, substantially as described.

3. In a bread-cutter, the combination with a supporting-frame provided with a platform for supporting the bread to be sliced, said platform being provided with an adjustable back, of a rotary shaft mounted in the frame and provided with a laterally-projecting pin, a cutter on the said shaft, a feed-roller having projecting points and mounted in the frame at the end of the platform and at right angles to the cutter-shaft, said roller having an angular portion at one end and provided at the other end with radial fingers adapted to be engaged by the pin of the cutter-shaft, and a spring secured to the frame and having its free end resting against the angular portion of the feed-roller, substantially as described.

4. In a bread-cutter, the combination with a supporting-frame having a platform, of a rotary cutter mounted in the frame, a feed-roller at right angles to the cutter and at the end of the platform, means for imparting step-by-step movement to the feed-roller, a rest-bar between the cutter and feed-roller and provided with an upright at one end, a back guide having one end secured to an upright of the frame and screws connecting the other end of the guide to the upright of the rest-bar, substantially as described.

5. The combination with the bread-cutter, comprising a plurality of uprights one of which is solid, a platform, a rotary cutter, and a feed-roller, of a box for receiving the cutter, said box having a partition extending entirely across the same, and a second partition extending partially across the box, said second partition registering with the solid upright of the frame to form a complete partition when the cutter is in the box and forming a compartment for the sliced bread, substantially as described.

CHARLES PERSON.

Witnesses:
JOHN LOFGREN,
A. B. DUNCAN.